Aug. 5, 1947.  C. C. BENNETT ET AL  2,425,171
DYNAMOMETER
Filed Dec. 4, 1944  2 Sheets-Sheet 1

INVENTORS.
Claude C. Bennett,
Harold L. Bennett.
BY
A. E. Wilson
ATTORNEY.

Aug. 5, 1947.  C. C. BENNETT ET AL  2,425,171

DYNAMOMETER

Filed Dec. 4, 1944  2 Sheets-Sheet 2

INVENTORS.
Claude C. Bennett,
Harold L. Bennett,
BY
R. E. Wilson.
ATTORNEY.

Patented Aug. 5, 1947

2,425,171

UNITED STATES PATENT OFFICE 2,425,171

DYNAMOMETER

Claude C. Bennett and Harold L. Bennett,
South Bend, Ind.

Application December 4, 1944, Serial No. 566,583

9 Claims. (Cl. 188—90)

This invention relates to dynamometers of the so-called absorption type adapted to determine the power or torque developed by an engine.

In absorption dynamometers a liquid such for example as water is employed as the energy absorbing medium. The dynamometer is provided with spaced rotor and stator elements operably connected to the engine driving shaft and to an oscillating casing respectively. The rotor and stator elements are provided with liquid deflecting blades to energize and absorb energy from a circulating liquid. The stator member is mounted in a casing and the energy absorbed from the liquid exerts an oscillating force to the casing. The amount of this oscillating force is weighed to determine the energy developed by the engine. This energy is dissipated by conversion into heat, and the heated liquid may be dispelled from the dynamometer and cooled by a heat exchanger, or cooler liquid may be introduced into the dynamometer to maintain constant power absorbing characteristics.

An object of this invention resides in the provision of an improved dynamometer wherein a more efficient circuit for the escaping heated liquid is provided.

A further object of the invention is to provide a dynamometer wherein axially spaced stator members cooperate with a rotor member to define a more efficient energy absorbing path for the energy absorbing liquid.

Another object of the invention resides in the provision of a dynamometer having oppositely disposed nested casing and stator members adapted to receive therebetween a rotor member to cooperate with the stator members to provide spaced energy absorbing liquid circuits.

Yet another object is to provide an improved method of making a dynamometer wherein cast stator and casing members may be fitted together with minimum finishing operations to receive a cast rotor element to form an energy absorbing liquid circuit.

A further object of this invention is to provide a dynamometer having a rotor element adapted to rotate adjacent spaced inwardly extended flanges carried by a stator member to cooperate therewith to define a heated liquid outlet communicating with the space within the rotor member through spaced openings extending through the rotor member.

Yet a still further object of the invention resides in the provision of an improved dynamometer having spaced energy absorbing circuits communicating with a centrally disposed outlet for heated liquid whereby the flow of energy absorbing fluid through the dynamometer may be more accurately controlled.

Another object of the invention is to provide a dynamometer having spaced casing members adapted to receive nested stator elements having fluid deflecting blades disposed to absorb greater energy from circulating liquid energized by a rotor member driven by a prime mover.

A further object is to provide a dynamometer having juxtaposed rotor and stator members having angularly related blades adapted to impart to and absorb energy from a circulating liquid in a more efficient manner to convert maximum power into heat imparted to the circulating liquid, and to expel the heated liquid through an outlet passage positioned between the rotor and stator elements.

Other objects and advantages of this invention will be apparent from the following detailed description considered in connection with the accompanying drawings, submitted for purposes of illustration only and not intended to define the scope of the invention, reference being had for that purpose to the subjoined claims.

In the drawings wherein similar reference characters refer to similar parts throughout the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
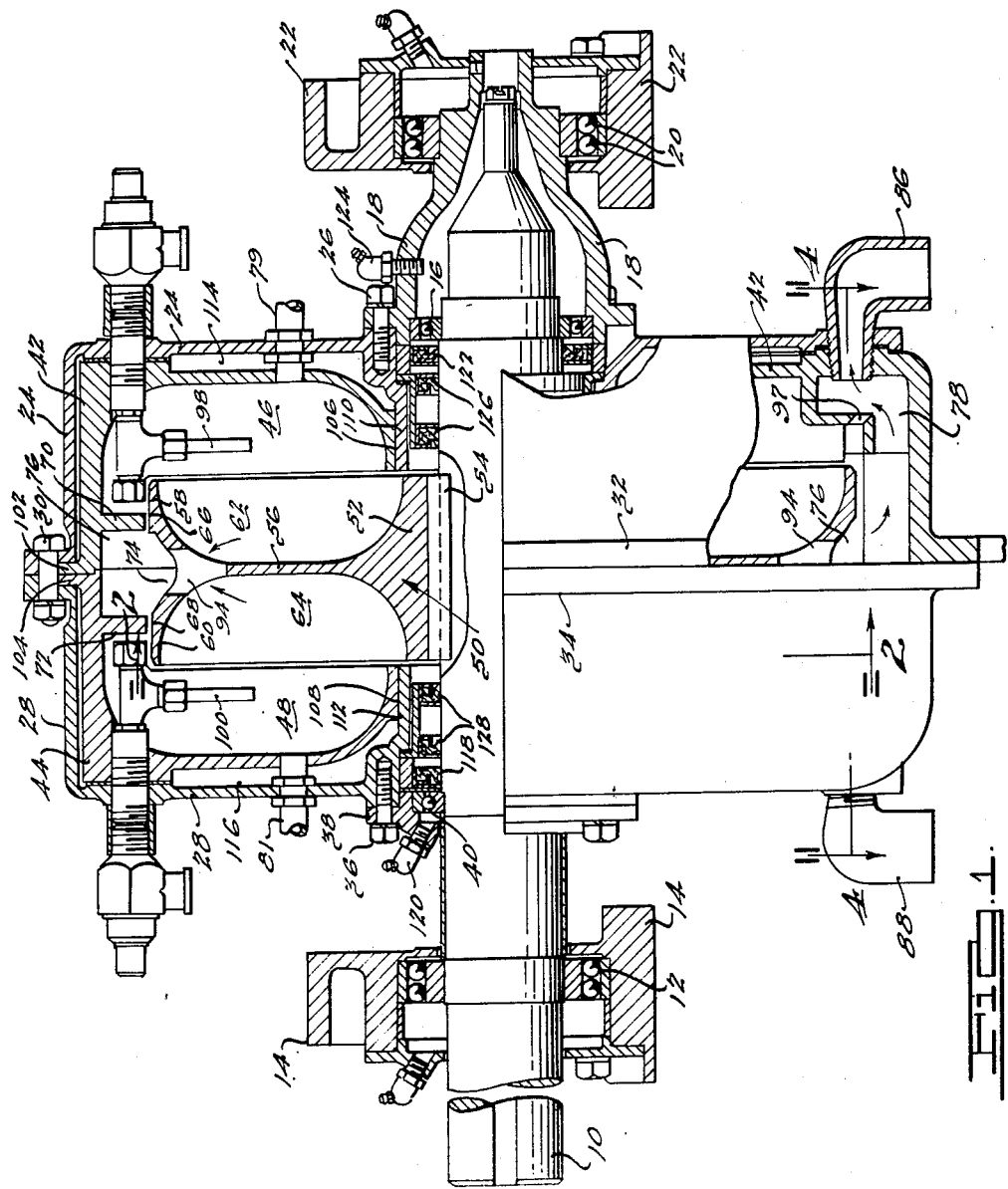
Fig. 1 is a longitudinal sectional view of a dynamometer embodying the present invention.

Referring now to Fig. 1 it will be observed that a shaft 10 is journaled at one end in a bearing 12 carried by a stationary member 14. The other end of the shaft 10 is journaled in a bearing 16 carried by a housing 18. The housing 18 is journaled in a bearing 20 carried by a stationary member 22. The housing 18 is suitably secured to a casing 24 by means of bolts 26, and the casing 24 is secured to an oppositely disposed casing 28 by means of bolts 30 extending through radially extended flanges 32 and 34 carried by the casing members 24 and 28 respectively.

The left hand end of the casing 28 is secured by means of bolts 36 to a ring 38 mounted on the shaft 10 by means of a bearing 40. The casings 24 and 28 are provided with oppositely disposed stator members 42 and 44 having angularly related blades 46 and 48 respectively preferably positioned at an angle axially to induce circulating liquid to impinge thereagainst and move radially inwardly to absorb the maximum energy from the circulating liquid. The stator members 42 and 44 and the casing members 24 and 28 are mounted on the bearings 16 and 40 in such a manner as to be free to oscillate on the shaft 10.

Interposed between the stator members 42 and 44 is a rotor member 50 having a hub 52 secured to the shaft 10 in any suitable manner as by means of a key 54. The rotor member 50 is provided with a radially extended flange 56 terminating in axially extending flanges 58 and 60. The spaces between the hub 52 and the flanges 58 and 60 are provided with liquid energizing blades 62 and 64 respectively.

The blades 62 and 64 are preferably positioned at an angle axially to enable them to receive liquid from the stator members 42 and 44 in a more efficient manner and impart energy thereto as the liquid is directed outwardly upon rotation of the rotor member 50.

Figures 3, 4:
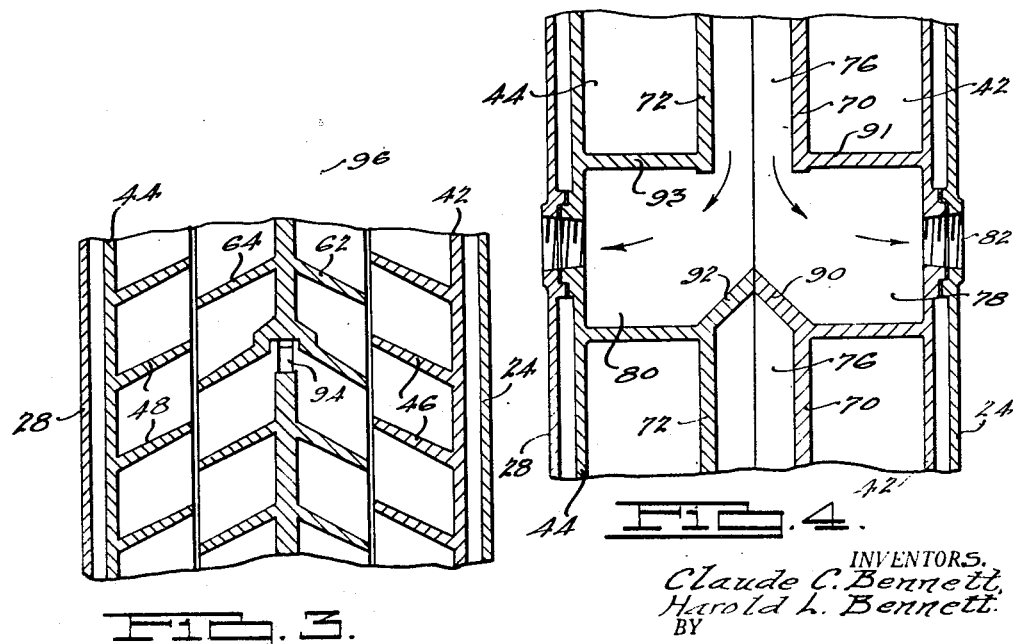
Fig. 3 is a sectional view taken substantially on the line 3—3 of Fig. 3 looking in the direction of the arrows.
Fig. 4 is a sectional view taken substantially on the line 4—4 of Fig. 1 looking in the direction of the arrows.

The flanges 58 and 60 of the rotor member 50 are provided with substantially flat axially extending surfaces 66 and 68 respectively adapted to rotate adjacent the ends of inwardly extended flanges 70 and 72 carried by the stator members 42 and 44 respectively. The flanges 70 and 72 of the stator members 42 and 44 cooperate with the contoured outer surface 74 of the rotor member 50 to define a circumferentially extending liquid outlet passage 76 communicating with spaced outlet chambers 78 and 80 having openings 82 and 84 adapted to receive conduits 86 and 88 respectively to permit the escape of heated liquid from the dynamometer unit. As illustrated in Fig. 4 the inwardly extending flanges 70 and 72 of the stator members 42 and 44 have angularly related converging walls 90 and 92 and axially extending walls 91 and 93 respectively adapted to interrupt the cooling space 76 circumferentially and to form the spaced liquid outlet chambers 78 and 80. The heated liquid from the outlets 78 and 80 may be passed through a heat exchanger or radiator and be introduced into the casing through inlets 79 and 81. A closed system may thus be provided to overcome difficulties encountered with metering systems wherein an attempt is made to meter the inlet of cool liquid and the outlet of heated liquid to obtain uniform power absorbing characteristics.

Figure 2:
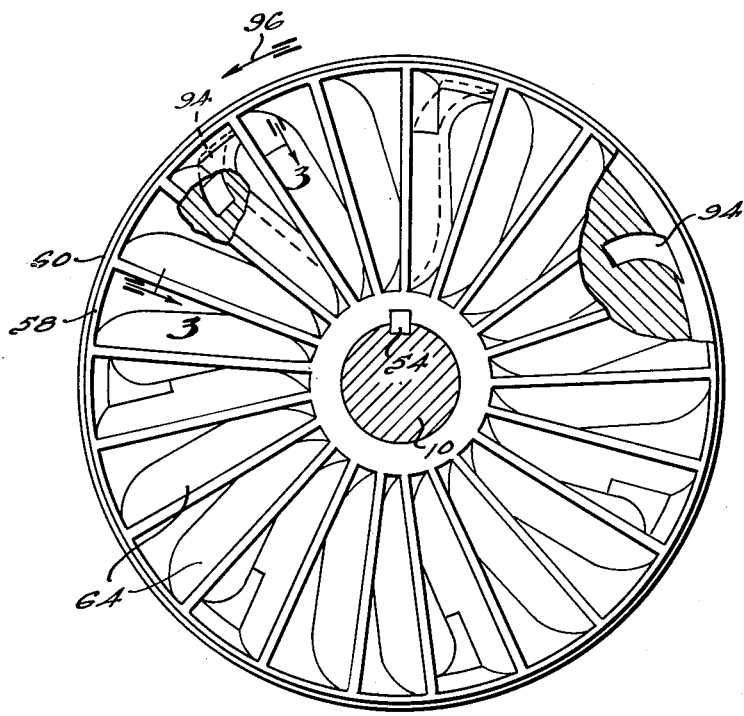
Fig. 2 is a sectional view taken substantially on the line 2—2 of Fig. 1 looking in the direction of the arrows.

As more clearly illustrated in Fig. 2 the rotor 50 is provided with a plurality of generally radially extended openings 94 interconnecting the space within the liquid energizing portions of the rotor defined by the blades 62 and 64 with the cooling chamber 76. The openings 94 are preferably backwardly inclined with reference to the direction of rotation of the rotor member as indicated by the arrow 96 on Fig. 2. A plurality, for example six angularly inclined holes 97 extend through the horizontal portions of the stator members 42 and 44 as illustrated in Fig. 1 to permit the escape of a portion of the heated liquid from the rotor to the outlet chambers 78 and 80.

Vent openings 98 and 100 extending through the walls of the casings 24 and 28 and the stator members 42 and 44 extend inwardly relative to the stator members 42 and 44 respectively to permit the escape of entrained air when the dynamometer is in operation.

It will be noted that the stator members 42 and 44 have radially extended flanges 102 and 104 respectively adapted to be received within the radially extended flanges 32 and 34 of the casing members 24 and 28.

The stator members 42 and 44 have annular surfaces or cylinders 106 and 108 respectively adapted to be received on the cylindrical surfaces 110 and 112 of the casing members 24 and 28 respectively. It will be noted that the stator and casing members may be formed by a casting operation, and that it is only necessary to finish machine the annular surfaces or cylinders 106 and 108 and the end flanges 102 and 104 of the stator members 42 and 44 respectively, and it is only necessary to finish machine the cylindrical surfaces 110 and 112 and the flanges 32 and 34 of the casing members 24 and 28 respectively.

A seal 118 interposed between the shaft 10 and the casing 28 is provided to seal at the space adjacent the bearing 40 to prevent the escape of lubricant supplied thereto through a suitable fitting 120. A seal 122 interposed between the shaft 10 and the casing 24 is provided to seal the space between the housing 18 and the shaft 10 to prevent the escape of lubricant supplied to the bearing 16 by a fitting 124. Seals 126 and 128 interposed between the shaft 10 and the casings 24 and 28 respectively are provided to prevent the escape of power absorbing liquid from the space within the dynamometer.

The operation is as follows: When it is desired to determine the power output or torque developed by an engine, the driving shaft of the engine is connected to the shaft 10 of the dynamometer by any suitable coupling means. The engine is then run in the usual manner to drive the rotor member 50 of the dynamometer.

Liquid is introduced into the dynamometer to fill the space between the rotor 50 and the stator members 42 and 44. The blades 62 and 64 of the rotor member energize the liquid and direct it radially outwardly. The outer curved portion of the rotor directs the circulating liquid axially in opposite directions to induce it to flow into the pockets formed between the blades 46 and 48 of the stator members 42 and 44 respectively. Power is absorbed from the circulating liquid by the blades 46 and 48 of the stator members, and this power exerts a force tending to oscillate the casings 24 and 28 about the bearings 16 and 40. The force tending to oscillate the casings may be measured by any suitable weighing mechanism to determine the torque developed by the engine.

Absorption of power or torque in the dynamometer is accompanied by a rise in temperature of the circulating liquid due to the conversion of energy into heat. The heated liquid may be dispelled from the dynamometer through the outlet passages 94 projecting radially through the rotor 50 as illustrated in Figs. 1, 2 and 3 whereupon the heated liquid is introduced into the heated liquid outlet chamber 76 defined by the central axially extended walls of the stator members 42 and 44 and the inwardly extended flanges 70 and 72 carried by the stator members 42 and 44 and positioned to lie adjacent the surfaces 66 and 68 of the rotor member.

It is not necessary that liquid outlet openings 94 be interposed between each of the blades 62 and 64 of the rotor member since all that is required is that a sufficient number of liquid outlet openings be provided to permit the escape of a portion of the heated liquid, sufficient to maintain the temperature of the liquid within a desired operating range. As illustrated in Fig. 2 outlet openings 94 may be positioned between each third blade of the rotor member. It will be understood that if desired additional openings may be employed, and the size of the openings may be varied to effect the desired cooling characteristics.

Heated liquid from the chamber 76 is induced to rotate, due to the frictional force exerted by the outer edge of the rotor member 50, and the heated liquid flows through the outlet passages 94 and 97 into the liquid outlet chambers 78 and 80 defined by the annularly related walls 90 and 92 and the walls 91 and 93 of the inwardly directed flanges 70 and 72 of the stator members 42 and 44 respectively as illustrated in Fig. 4 whereupon the liquid is directed through the outlet openings 82 and 84 to the outlet conduits 86 and 88 illustrated in Fig. 1. The heated liquid from the outlet conduits 86 and 88 may be passed through any convenient heat exchanger or radiator and be introduced into the circuit again through the inlet passages 79 and 81 projecting through the casings 24 and 26 and their associated stator members 42 and 44. A constant supply of liquid can thus be maintained in the circuit to insure uniform operation, and overcoming the difficulties encountered in attempting to meter the outlet of heated liquid and the inlet of cool liquid.

The volume of the liquid may be varied to effect desired torque absorbing characteristics so that an engine may be continuously run at a predetermined speed to give an indication of the power developed by the engine over an extended period of time.

We claim:

1. A dynamometer comprising spaced bladed stator members having inwardly directed webs positioned axially inside of the blades thereof, and a bladed rotor positioned between the stator members and having axially extended flanges positioned to rotate adjacent the webs of the stator members to cooperate therewith to provide a circumferentially extending liquid outlet passage.

2. In a dynamometer, cast oppositely disposed casing members having radially extending securing flanges and inwardly directed annular cylindrical members, cast oppositely disposed stator members having radially extending securing flanges adapted to be received within the flanges of the casing member in locking engagement therewith, and inwardly directed cylinders carried by the stator members and adapted to engage the annular cylindrical members of the casing members.

3. A dynamometer comprising spaced casing members having radially extended flanges, spaced stator members positioned in the casing members and having radially extending flanges adapted to lock the stator members to the casing members, axially extended cylinders carried by the casing members and adapted to project into cylinders carried by the stator members, a shaft projecting through the casing and stator members, a bladed rotor member carried by the shaft intermediate the stator members and having radially extending passageways communicating with the space between the stator members, and inwardly extending flanges carried by the stator members to over-lie the rotor member and cooperate therewith in the formation of a liquid outlet passageway, said flanges having angularly related walls to interrupt the passageway circumferentially to exhaust liquid from said passageway.

4. A dynamometer comprising spaced bladed stator members, a bladed rotor interposed between the stator members and having axially extended flanges and radially extended liquid outlet openings between the flanges, and circumferentially extending inwardly disposed webs positioned axially inside of the blades of the stator members and positioned to overlie the flanges of the rotor and cooperating therewith to define a water outlet passage.

5. A dynamometer comprising cast oppositely disposed casing members having radially extending securing flanges and inwardly directed annular cylindrical members, cast oppositely disposed stator members having energy absorbing blades and radially extending securing flanges adapted to be received within the flanges of the casing members in locking engagement therewith, inwardly directed cylinders carried by the stator members and adapted to engage the annular cylindrical members of the casing members, a centrally disposed shaft extending through the casing and stator members, and a rotor carried by the shaft and having liquid energizing blades adapted to energize liquid and direct it to the energy absorbing blades of the stator members.

6. A dynamometer comprising a spaced casing members having radially extended flanges, spaced stator members positioned in the casing members and having radially extending flanges adapted to lock the stator members to the casing members, axially extended cylinders carried by the casing members and adapted to project into cylinders carried by the stator members, a shaft projecting through the casing and stator members, and a bladed rotor member carried by the shaft intermediate the stator members and having radially extending passageways communicating with the space between the stator members.

7. A dynamometer comprising spaced bladed stator members, a bladed rotor interposed between the stator members and having axially extended flanges and radially extended liquid outlet openings between the flanges, and circumferentially extending inwardly disposed webs positioned axially inside of the blades of the stator members and positioned to overlie the flanges of the rotor and cooperating therewith to define a centrally disposed water outlet passage, the inwardly extending webs of the stator members converging to interrupt the water outlet passage and extending axially to define axially disposed liquid outlet passages.

8. A dynamometer comprising a casing mounted for oscillation about an axis, bladed stator members spaced from each other along said axis, peripheral channel means including spaced inwardly directed annular flanges positioned axially inside of the stator blades, and a bladed rotor mounted between the stator members and having a peripheral cylindrical flange rotatable adjacent the edges of each of said annular flanges and cooperating therewith to form a circumferential outlet passage for liquid heated by the dynamometer.

9. A dynamometer comprising spaced stator members mounted for oscillation about a predetermined axis, a rotor interposed between the stator members, said stator members and said rotor being provided with radial blades skewed relative to said axis, and peripheral channel means comprising spaced inwardly directed flanges positioned axially inwardly of the stator blades, said rotor having a peripheral axially extended flange rotatable adjacent the edges of each of said annular flanges and cooperating therewith to form a circumferential passage for liquid heated by operation of the dynamometer.

CLAUDE C. BENNETT.
H. L. BENNETT.

REFERENCES CITED

The following references are of record in the file of this patent:

UNITED STATES PATENTS

| Number | Name | Date |
|---|---|---|
| 2,126,751 | De La Mater | Aug. 16, 1938 |
| 2,185,491 | Anderson et al. | Jan. 2, 1940 |

FOREIGN PATENTS

| Number | Country | Date |
|---|---|---|
| 15,695 | Great Britain | July 4, 1912 |